United States Patent
Hoshino et al.

(10) Patent No.: US 7,879,415 B2
(45) Date of Patent: Feb. 1, 2011

(54) DISCRIMINATION MEDIUM AND DISCRIMINATION METHOD THEREFOR

(75) Inventors: Hidekazu Hoshino, Yokohama (JP); Hiroyuki Matsumoto, Yokohama (JP); Itsuo Takeuchi, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 961 days.

(21) Appl. No.: 11/664,162

(22) PCT Filed: Sep. 30, 2005

(86) PCT No.: PCT/JP2005/018162

§ 371 (c)(1),
(2), (4) Date: Mar. 29, 2007

(87) PCT Pub. No.: WO2006/038561

PCT Pub. Date: Apr. 13, 2006

(65) Prior Publication Data

US 2008/0090029 A1 Apr. 17, 2008

(30) Foreign Application Priority Data

Oct. 1, 2004 (JP) .............................. 2004-290248

(51) Int. Cl.
*B44F 1/10* (2006.01)
(52) U.S. Cl. .................. 428/29; 428/697; 428/699; 428/701; 428/702
(58) Field of Classification Search .................. 428/29, 428/697, 699, 701, 702
See application file for complete search history.

(56) References Cited

U.S. PATENT DOCUMENTS

| 7,316,422 | B1 | 1/2008 | Schmitz |
| 2006/0023132 | A1 | 2/2006 | Mengel et al. |
| 2007/0037290 | A1* | 2/2007 | Hoshino et al. ............. 436/170 |
| 2007/0081144 | A1* | 4/2007 | Hoshino et al. ............... 356/71 |

FOREIGN PATENT DOCUMENTS

DE 199 41 295 A1 3/2001

(Continued)

OTHER PUBLICATIONS

Mar. 8, 2010 Office Action for European Patent Application No. 05788071.8.

*Primary Examiner*—Gwendolyn Blackwell
(74) *Attorney, Agent, or Firm*—Oliff & Berridge, PLC

(57) ABSTRACT

A thermosensitive ink layer 102 is composed of a thermochromic material which changes from black to a transparent state and is formed on a substrate 101 made from a PET film by heating. A cholesteric liquid crystal layer 103 on which a hologram 105 of an appropriate form is formed on the cholesteric liquid crystal layer is mounted thereon. At ordinary temperature, the thermosensitive ink layer 102 exhibits a property of light absorption and a property of selective reflection and a color shifting of the cholesteric liquid crystal layer 103 are observed. The thermosensitive ink layer 102 becomes transparent by heating and the figure 104 on the substrate 101 is also visible. The determination of the authenticity thereof is performed by utilizing the change of view. Therefore, the anticounterfeiting effects are superior to those of the discrimination techniques using conventional techniques, and this enables articles to be distinguished easily and reliably.

12 Claims, 5 Drawing Sheets

FOREIGN PATENT DOCUMENTS

| | | |
|---|---|---|
| JP | A 63-051196 | 3/1988 |
| JP | A 04-144796 | 5/1992 |
| JP | A 2001-180086 | 7/2001 |
| JP | A 2002-214578 | 7/2002 |
| JP | A 2003-145965 | 5/2003 |
| JP | A 2003-195045 | 7/2003 |
| JP | A 2004-177636 | 6/2004 |
| WO | WO 02/063495 * | 8/2002 |
| WO | WO 2004/028824 A2 | 4/2004 |
| WO | WO 2004/033228 A1 | 4/2004 |
| WO | WO 2005/040871 * | 5/2005 |

* cited by examiner

↓ heating

↓ cooling to room temperature

DISCRIMINATION MEDIUM AND DISCRIMINATION METHOD THEREFOR

TECHNICAL FIELD

The present invention relates to techniques for determining whether or not articles are authentic by using visual effects. In particular, the present invention relates to a technique using specific views obtained by viewing angles and specific polarization filters, and the differences in transmission conditions of light which varies depending on environmental conditions such as temperature, in combination therewith.

BACKGROUND ART

Counterfeits of articles (for example, goods and garments), which are produced by copying the appearances of authentic articles, are being sold and cause problems. Under these circumstances, in order to ensure performance, reliability and security of articles and to maintain the worth of the brands of articles, techniques for verifying the authenticity of the articles are required.

A method in which printing is performed on an article by using special ink or a method in which a chip having special reflection characteristics is applied onto an article may be used as a technique for verifying the authenticity of articles.

In the above method using the special ink printed on an article, for example, a predetermined character or a figure is printed on an article by using an ink, which is fluorescent under ultraviolet light, as the above ink. When ultraviolet light is irradiated on the article, the character or the figure becomes visible on the article, so that the authenticity of the article can be determined. For example, an ink having particles of a magnetic material or magnetized particles mixed therewith may be applied on an article, and the authenticity of the article can be verified by using magnetic sensors.

In the above method using the chip having special reflection characteristics, a chip using optical characteristics of a cholesteric liquid crystal or a hologram formed thereon is used. For example, this technique is disclosed in Japanese Unexamined Patent Applications Publication Nos. S63-51193 and H4-144796.

However, it is somewhat easy to obtain inks similar to various special inks, and anticounterfeiting effects cannot be effectively obtained. Visual holograms, which are sophisticated counterfeits, for which the authenticity thereof is not easily determined by observation, are on the market. Therefore, determination of the authenticity only by using a hologram is difficult.

In view of the increasing sophistication of counterfeiting techniques, a discrimination medium using cholesteric liquid crystal is required which cannot be easily counterfeited and which will provide a good discriminating ability.

DISCLOSURE OF THE INVENTION

An object of the present invention is to provide a technique of which anticounterfeiting effects are better than those of discrimination techniques using the above conventional techniques, and which enables the article to be distinguished easily and reliably.

The discrimination medium of the present invention provides an optical functional layer using a thermochromic material or a photochromic material and a color shifting layer mounted on the optical functional layer.

The thermochromic material has a property which shows a predetermined color at a first temperature and becomes transparent at a second temperature. It should be noted that the relationship "(first temperature)>(second temperature)" and "(second temperature)>(first temperature)" can be chosen by selecting the material. The predetermined color also varies according to the material. Moreover, the material has a property of reversibility or irreversibility regarding the above change, and the material preferably has reversibility.

In the present invention, the first temperature may be an ordinary temperature (for example, 25° C.) and the second temperature may be one achieved by heating. In this case, the material preferably has a property in which a colored state changes to a transparent state or a transparent state changes to a colored state. Specifically, the material preferably appears to be black or a dark color. Such a structure enables the optical functional layer to function as a light absorption layer, and an optical function of the color shifting layer can be utilized effectively.

As a thermochromic material which becomes transparent by heating, microencapsulated pigments may be used. The pigment is composed of a film containing a photopolymerizable composition and an aliphatic amine or an aromatic amine, and the film includes reversible heat allochroic compositions and is ionized by an acid material. This thermochromic material can be made to appear to be black or a dark color, which functions as a light absorption layer at room temperature, and becomes transparent by heating, by appropriately selecting components.

As an available thermochromic material, a thermochromic ink (trade name: DynaColor, produced by Chromatic Technologies, Inc., United States) may be used.

As a method of heating a thermochromic material, dryers (for exposure to hot air), heating lamps, heaters, frictional heating, contacting with hot liquids, contacting with high temperature articles, and heating directly or indirectly by appropriate heating elements may be mentioned. As a method of heating by friction, a method in which heat is generated by rubbing with a hand may be mentioned.

A photochromic material has a property in which a colored state is changed to a transparent state, or a transparent state is changed to a colored state, not by heat, but by light (for example, ultraviolet light). A photochromic material is similar to the thermochromic material except that light is used to change the optical characteristics thereof. In other words, in a thermochromic material, a colored state changes to a transparent state, or a transparent state changes to a colored state, by heating, whereas in a photochromic material, a colored state changes to a transparent state, or a transparent state changes to a colored state by exposure to light.

A photochromic material is generally made from material which is photoisomerized by light. As the photochromic material, azoic dyes, Schiff chlorine materials, and O-nitrobenzene materials may be mentioned.

As an available photochromic material, a photochromic ink (trade name: DynaColor, produced by Chromatic Technologies, Inc., United States) may be used.

Color shifting is a phenomenon in which reflected light gradually shifts toward shorter wavelengths according to an increase in viewing angle. The color shifting layer exhibits such a phenomenon. In addition, as the color shifting changes reflected light toward shorter wavelengths, the color shifting layer looks bluish, this is called "blue shifting".

Moreover, the viewing angle represents an angle formed by a vertical line and a visual line against the surface of a target object. For example, the viewing angle of 0° represents a case in which the surface of a target object is viewed from a vertical direction. As the viewing angle approaches 90°, the target object is viewed more obliquely, and moreover, is viewed from nearly a parallel line against the surface of the target object.

The color shifting layer may be composed of a multilayer film formed by laminating plural light transparent films having different refractive indexes. It should be noted that the light transparency indicates transmission of visible light. The visible light is light which is generally visible to humans, specifically, the light in a wavelength range of 380 nm to about 780 nm.

Functions of color shifting will be explained by an example of a multilayer film formed by laminating plural light transparent films having different refractive indexes. FIG. 3 is a schematic view showing functions of color shifting. FIG. 3 shows a multilayer film 403 having a cross section structure in which two kinds of light transparent films 401 and 402 having different refractive indexes are alternately laminated.

When light obliquely enters into a multilayer film 403, the light reflects at each interface of a multilayer structure. These reflections are caused by the difference of the refractive indexes of the transparent films adjacent to each other. When one interface is viewed, the incident light is partially reflected and most of it is transmitted. That is, the light entering the interfaces of the laminated films reflect at each interface little by little. The light is basically reflected in the same direction at each interface, and therefore there is interference depending on optical path differences.

When the incident light enters the films from a direction approximately parallel to the surface, the optical path difference is small, and the light of shorter wavelengths interferes and is reinforced. In this way, when the viewing angle is increased, the reflected light of the shorter wavelengths interferes and is reinforced. As a result, when the multilayer film 403 is viewed under white light, while it appears to have a predetermined color at a viewing angle of 0°, a phenomenon in which the multilayer film gradually changes color to a bluish state as the viewing angle is increased is observed.

The multilayer film 403 may be composed of three or more kinds of thin films having different refractive indexes. There are various methods for laminating films and they may be performed such that thin films laminated adjacent to each other have different refractive indexes.

As a component exhibiting another color shifting, a cholesteric liquid crystal layer may be mentioned. The cholesteric liquid crystal layer has a structure in which liquid crystal molecules with different orientation may be laminated, and the incident light is reflected at the interfaces between each of the layers. Therefore, color shifting may be observed in the same way as shown in FIG. 3.

FIG. 4 shows a schematic structure of cholesteric liquid crystal layers. FIG. 5 shows a schematic view for explaining optical characteristics of a cholesteric liquid crystal layer. FIG. 5 shows a condition in which a right-handed circularly polarized light having a predetermined wavelength is reflected, and a left-handed circularly polarized light, a linearly polarized light, and right-handed circularly polarized light having other wavelengths are transmitted through a cholesteric liquid crystal layer 301, when natural light enter into the layer.

The cholesteric liquid crystal layer has a stacked structure. In one layer, long axes of liquid crystal molecules have the same orientation and are parallel to the plane thereof in a layer. The directions of the orientation slightly differ with respect to the adjacent layer, and the layers are stacked with the orientations rotating in a three-dimensional spiral structure overall.

In this structure, in a direction perpendicular to the layer, pitch P is a distance necessary for the molecular long axis to be rotated through 360° and return to the initial state, and an average refraction index of the respective layers is index n. In this case, the cholesteric liquid crystal layer selectively reflects circularly polarized light having a center wavelength $\lambda s$ satisfying the equation $\lambda s = n \times P$. That is, when white light enters into the cholesteric liquid crystal layer, a right-handed or left-handed circularly polarized light having a predetermined center wavelength is selectively reflected. In this case, circularly polarized light having the same circling direction as the reflected circularly polarized light but not having the wavelength of $\lambda s$, a circularly polarized light having a reverse circling direction to the reflected circularly polarized light, and a linearly polarized light are transmitted through the cholesteric liquid crystal layer.

The circling direction (rotating direction) of the reflected circularly polarized light is determined by selecting a spiral direction of the cholesteric liquid crystal layer. That is, when the long axes are seen from the incident direction of the light, by selecting either the spiral direction in which the molecular long axis of each layer orientation is clockwise or counterclockwise, the circling direction (rotating direction) of the reflected circularly polarized light is determined.

Of course, in the cholesteric liquid crystal layer, the optical characteristic in which the circularly polarized light having a predetermined circling direction of predetermined wavelength is selectively reflected, can be observed accompanied with color shifting. That is, the color observed at viewing angle of 0° gradually shifts toward the color of shorter wavelengths as the viewing angle increases.

In the present invention, the selective property of light absorption and light transmission produced by the optical functional layer and the optical characteristic of the color shifting layer are combined, and a discrimination medium showing a specific view may thereby be obtained. This optically specific view is explained in detail in the following embodiment.

In the present invention, the optical functional layer preferably comprises an ink which appears nearly black at an ordinary temperature and becomes transparent at a predetermined temperature which is higher than ordinary temperature. Moreover, in the present invention, the optical functional layer preferably functions as a light absorption layer. When the absorption efficiency of light is extremely high, the color is dark and the incident visible light is absorbed. This condition indicates that the optical functional layer functions as a light absorption layer.

As described in detail in the following embodiment, the optical functional layer functions as a light absorption layer in one case and functions as a light transparent layer in another case, and the appearance thereof can thereby be selected from the two cases of only one function of the color shifting layer and combination functions of the reflected light from the substrate layer and the color shifting layer. By utilizing the difference in the two appearances, a discrimination medium having extremely good discriminating function can be obtained.

In the present invention, a hologram is preferably formed on the color shifting layer. In such a structure, the phenomenon of the color shifting and the function of the hologram are combined and a specific view can be obtained. Therefore, the discriminating function is improved.

In the present invention, a figure viewed through the optical functional layer may be obtained by utilizing a figure on the surface of an article to which a discrimination medium of the present invention will be fixed. Alternatively, a substrate layer printed with a predetermined figure is adhered under the optical functional layer, and the figure is observed through the optical functional layer.

In the present invention, the optical functional layer is mounted on a substrate layer which is preferably printed or formed with a hologram. According to this aspect, when the optical functional layer becomes transparent, reflected light from the color shifting layer and reflected light of a print and a hologram from the substrate layer may be observed, and an optical discriminating function can thereby be obtained by the combination thereof.

Specifically, as a substrate layer, a multilayer film formed by laminating plural light transparent films having different refraction indexes is preferably adopted.

For example, multilayer films, an optical functional layer, and a cholesteric liquid crystal layer are laminated in order from the stationary side of an article, and are observed from the side of the cholesteric liquid crystal layer. In this case, the visual effect of the cholesteric liquid crystal layer and the synergized visual effect of the cholesteric liquid crystal layer and the multilayer film can be selected by a function like an optical switch of the optical functional layer.

As a method for fixing the discrimination medium of the present invention to an article, applying a function of an adhesive layer, applying setting adhesive materials, sewing on, laminating, screwing clamps, riveting, fixing with other fixing materials, and wiring or chaining may be mentioned.

The article on which the discrimination medium is fixed is exemplified by passports, bonds, important documents, various types of cards, gift certificates, clothing items, commodities, storage media, electric appliances, machine components, electronic components, and other various products. In addition, the discrimination medium of the present invention may be fixed to packages and packing materials of these articles. Moreover, the discrimination medium of the present invention may be fixed to tags and price tags of products, and tags and price tags themselves may be composed of the discrimination medium of the present invention.

The present invention may be explained as a discrimination method using the above discrimination medium. For example, when a thermochromic material is applied to an optical functional layer, a discrimination method for the discrimination medium of the present invention is a discrimination method for the above discrimination medium, which comprises a step without heating the discrimination medium and a step of heating the discrimination medium.

According to this aspect, the difference of the optical function by heating status may be optionally obtained, and the determination of the authenticity is performed by utilizing this difference. In this case, the determination of the authenticity is performed by visual observation, visual observation through an optical filter which transmits predetermined polarized light, automatic determination by machines, and multiple combinations thereof.

The discrimination method for the discrimination medium of the present invention comprises a first step for detecting a light reflected from the discrimination medium at a first temperature, a second step for detecting a light reflected from the discrimination medium at a second temperature which is higher than the first temperature, and a step for determining an authenticity process with reference to the first step for detecting reflected light and the second step for detecting reflected light.

According to this aspect, the authenticity is determined by two steps of before and after heating. For example, by image processing technology, the determination of the authenticity may be performed automatically according to the difference of photographic images before and after heating.

On the other hand, when a photochromic material is applied to the optical functional layer, the discrimination method for the discrimination medium of the present invention comprises a step in which light is not irradiated on the discrimination medium and a step in which light is irradiated on the discrimination medium.

According to this aspect, the difference of the optical function by irradiating status of light may be optionally obtained, and the determination of the authenticity is performed by utilizing this difference. In this case, the determination of the authenticity is performed by visual observation, visual observation through an optical filter that transmits predetermined polarized light, automatic determination by machines, and multiple combinations thereof.

The discrimination method for the discrimination medium of the present invention comprises a first step for detecting a light reflected from the discrimination medium without irradiation of light, a second step for detecting a light reflected from the discrimination medium with irradiation of light, and a step for determining authenticity process with reference to the first step detecting reflected light and the second step detecting reflected light.

According to this aspect, the authenticity is determined by two steps of before and after irradiating light. For example, by image processing technology, the determination of the authenticity is performed automatically according to the difference of the photographic images of before and after irradiating light.

Moreover, the discrimination method for the discrimination medium of the present invention may be explained as comprising a step for holding the optical functional layer to show light absorption characteristics and a step for holding the optical functional layer to show light transparency.

According to this aspect, by selecting a condition in which the optical functional layer transmits visible light or absorbs visible light, the view of a figure and the difference of the reflected light are obtained, and the authenticity thereof is thereby determined.

EFFECTS OF THE INVENTION

According to the present invention, a discrimination medium which significantly changes optical properties by a change of temperature and irradiation of ultraviolet light is obtained. In the present invention, a technique is provided in which anticounterfeiting effects are superior to those of the discrimination techniques using conventional techniques and the discrimination is performed easily and reliably.

Figure 1:
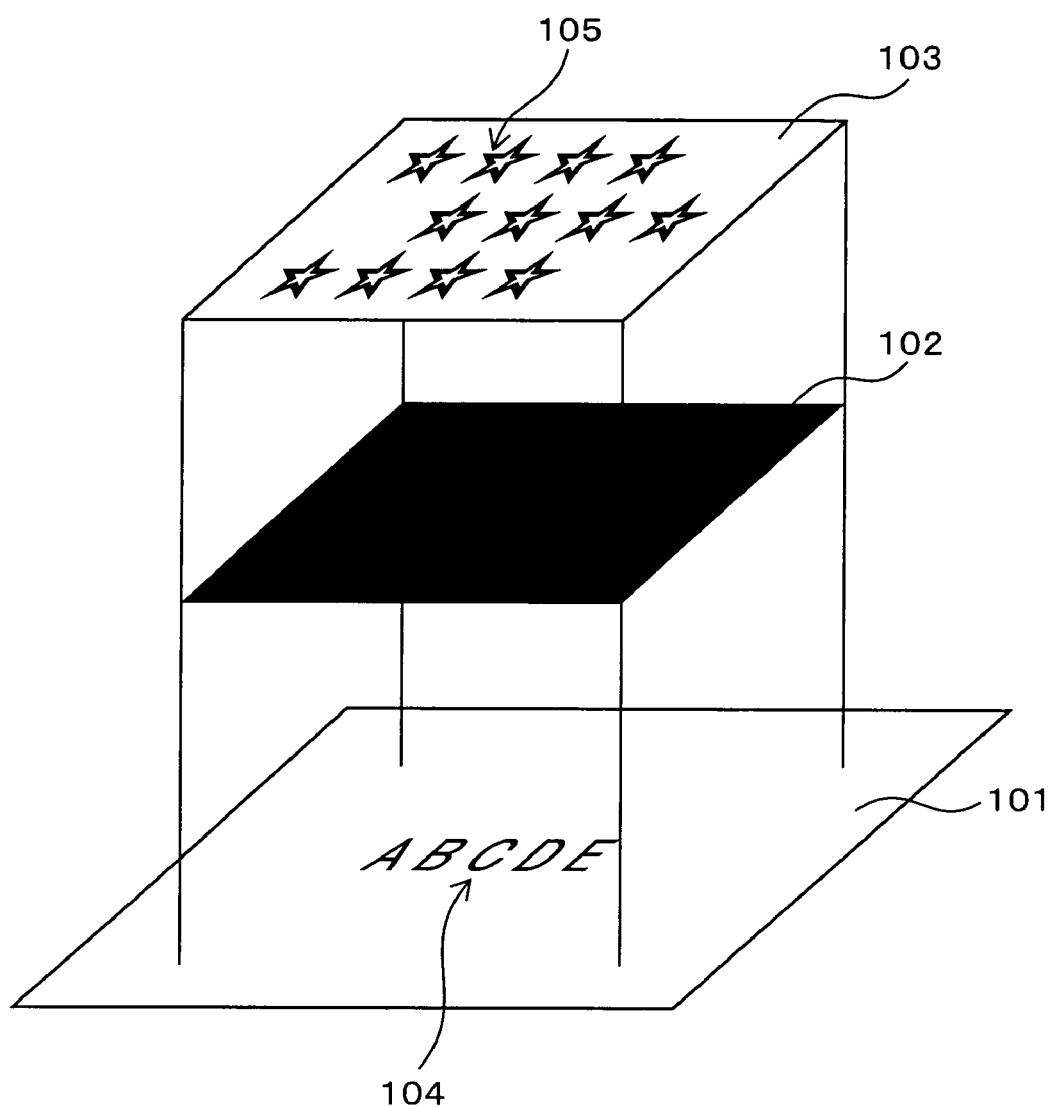
FIG. 1 shows a schematic structure of a discrimination medium of the present invention.

EXPLANATION OF REFERENCE NUMERALS 101 denotes a substrate, 102 denotes a thermosensitive ink layer, 103 denotes a cholesteric liquid crystal layer (a cholesteric liquid crystal layer and a hologram), 104 denotes a printed figure, 105 denotes a hologram, 111 denotes an adhesive layer, 112 denotes a separator, 121 denotes a setting adhesive layer, 131 denotes a TAC (triacetylcellulose) film, 140 denotes a piece of laminated film, 150 denotes a rolled discrimination medium, 160 denotes a cutting line, 201 denotes a background, 301 denotes a cholesteric liquid crystal layer, 401 denotes a light transparent film, 402 denotes a light transparent film, 403 denotes a multilayer film, 801 denotes an apparatus for determining authenticity, 802 denotes a stage, 803 denotes an article for determining the authenticity, 804 denotes an apparatus for irradiating visible light, 805 denotes a camera, 806 denotes a heating lamp, 807 denotes a determining section, 808 denotes a memory, and 809 denotes an output section.

BEST MODE FOR CARRYING OUT THE INVENTION

1. First Embodiment

Composition of First Embodiment

FIG. 1 shows a schematic structure of a discrimination medium of the present invention. FIG. 1 shows a substrate 101, a thermosensitive ink layer 102, a cholesteric liquid crystal layer 103, a printed FIG. 104, and a hologram 105.

The substrate 101 is a PET (polyethylene terephthalate) film which is 25 µm thick. FIG. 104 are printed with a black ink on the surface of the substrate 101. Characters, drawings, any designs, and things such as photographs may be used as the FIG. 104. The FIG. 104 may be formed with a hologram.

An adhesive layer and a separator (exfoliate paper) which are not shown in FIG. 1 are mounted on the back side of the substrate 101. The substrate 101 is fixed to an article by removing the separator and contacting the adhesive layer with an appropriate article.

The thermosensitive ink layer 102 is a layer in which a thermosensitive ink including a thermochromic material is coated on the surface of the substrate 101. This layer 102 functions as an optical functional layer of the present invention, which appears to be black at ordinary temperature (25° C.) and becomes transparent at a temperature of 35° C. or higher.

The thermosensitive ink layer 102 changes reversibly by temperature, and it changes from transparent to black by lowering the temperature.

The cholesteric liquid crystal layer 103 is a layer which is formed with a hologram on the cholesteric liquid crystal layer. The cholesteric liquid crystal layer 103 has a characteristic of reflecting a right-handed circularly polarized light of the wavelength corresponding to red, when it is viewed from the upper side of the figure, that is, the side of the cholesteric liquid crystal layer 103.

The manufacturing method for the cholesteric liquid crystal layer 103 is explained below. First, a low molecular cholesteric liquid crystal is dissolved and maintained in a polymerized monomer, so that cholesteric liquid crystals grow. Then, the low molecular liquid crystals are joined by photoreaction or thermal reaction, so that the molecular orientation is fixed and polymerized. As a result, a raw liquid of cholesteric liquid crystals is obtained. The polyethylene terephthalate (PET) which is 50 µm thick as a substrate 11, is coated over the entirety thereof with the raw liquid at a predetermined thickness, and a cholesteric orientation and a molecular orientation thereof are thereby fixed. In this case, the torsion pitch P along with the laminated direction of the cholesteric liquid crystal molecular is uniform and has a laminated thickness of 2 µm. The cholesteric liquid crystal layer has a thickness of about 0.5 to 5.0 µm.

In order to obtain a raw liquid of the cholesteric liquid crystal, a thermotropic polymer liquid crystal of the branched-chain type or the straight-chain type may be heated to a temperature of the liquid crystal transition point thereof or higher, so that a cholesteric liquid crystal structure grows. Then, the molecular orientation thereof is fixed by cooling to a temperature of the liquid crystal transition point or lower. Alternatively, a lyotropic polymer liquid crystal of the branched-chain type or the straight-chain type may be oriented in a cholesteric orientation in a solvent, and the molecular orientation thereof is fixed by gradually evaporating the solvent.

As a raw material of the above materials, a branched-chain type polymer having a liquid crystal forming group in a branched-chain, such as a polyacrylate, a polymethacrylate, a polysiloxane, and a polymalonate may be mentioned. Alternatively, a straight-chain type polymer having a liquid crystal forming group in a straight chain, such as a polyester, a polyester amide, a polycarbonate, a polyamide, and a polyimide may be mentioned.

The hologram 105 is formed by embossing a punch with an appropriate figure to the cholesteric liquid crystal layer and partially distorting the stacked structure thereof.

The cholesteric liquid crystal layer 103 includes a TAC (triacetylcellulose) film as a substrate, a surface of which is coated with a cholesteric liquid crystal layer, which is not shown in FIG. 1.

Function of First Embodiment

Figure 2A:
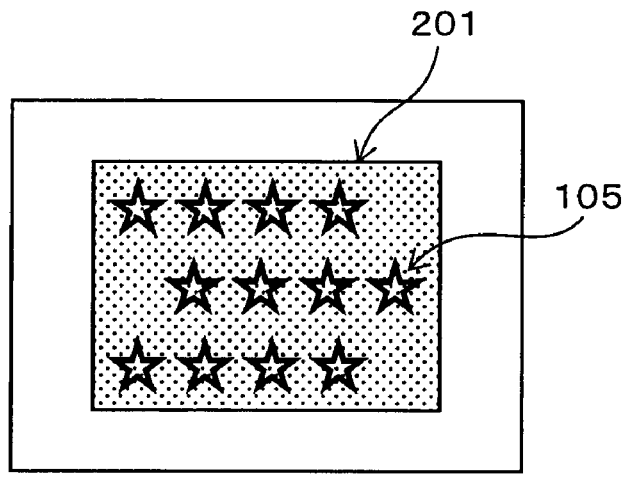
FIGS. 2A, 2B, and 2C are schematic views for explaining visual effects of the present invention.
Figure 2B:
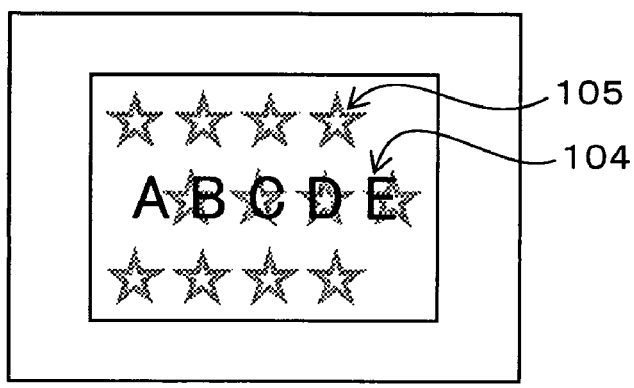
Figure 2C:
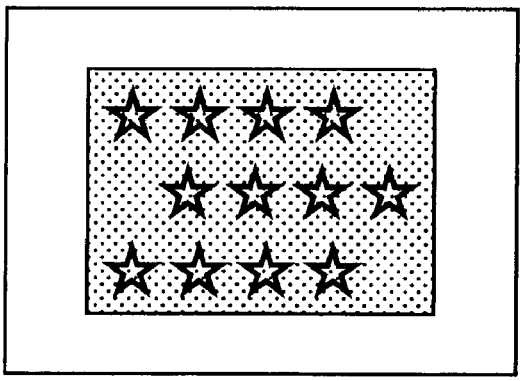
Figure 3:
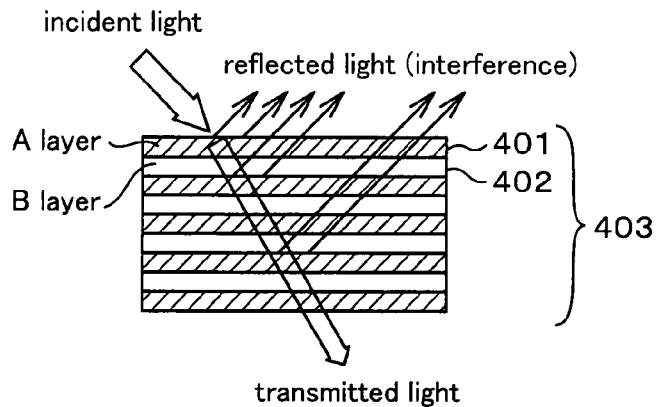
FIG. 3 is a schematic view for explaining a function of color shifting.
Figure 4:
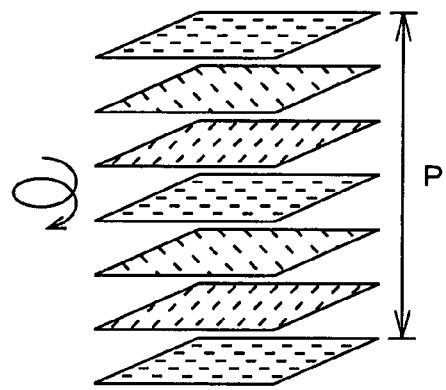
FIG. 4 shows a schematic structure of a cholesteric liquid crystal layer.
Figure 5:
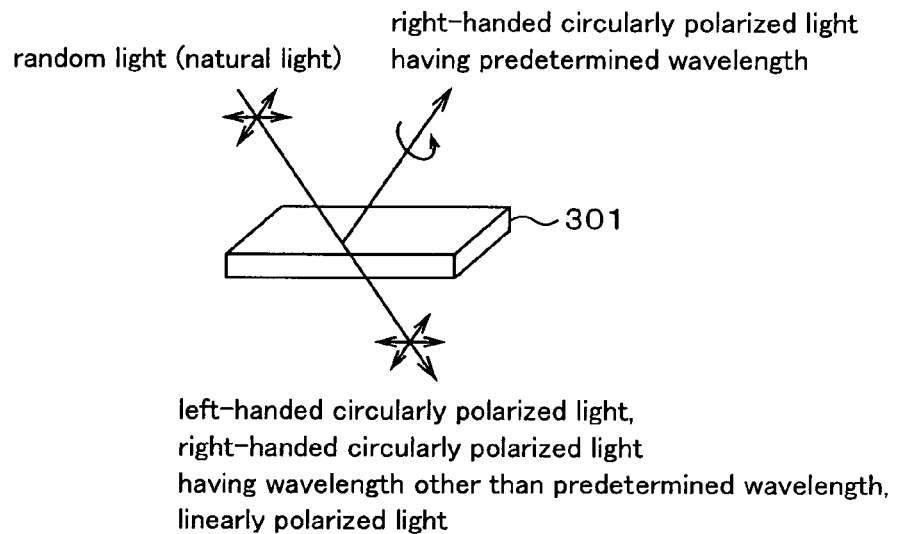
FIG. 5 is a schematic view for explaining optical characteristics of a cholesteric liquid crystal layer.

FIGS. 2A, 2B, and 2C are schematic views for explaining visual effects of the discrimination medium of the present invention. First, at ordinary temperature (25° C.), the case of viewing the discrimination medium shown in FIG. 1 from the side of the cholesteric liquid crystal layer 103 will be explained. In this case, because the thermosensitive ink layer 102 is black, only a right-handed circularly polarized light in red that is reflected at the cholesteric liquid crystal layer 103 is visible. Specifically, the figure of the hologram 105 tinged with red with a metallic luster is observed.

This condition is shown in FIG. 2A. FIG. 2A shows the hologram 105 tinged with red with a metallic luster in the background 201 of the red with the metallic luster.

In this condition, as the viewing angle increases, the figure of the hologram 105 tinged with a metallic luster is seen to shift from red to colors of the shorter wavelengths.

In this condition, when the discrimination medium is observed by using an optical filter which selectively transmits a left-handed circularly polarized light, the right-handed circularly polarized light in red reflected at the cholesteric liquid crystal layer 103 is blocked by the filter, and the hologram thereby cannot be seen, and the discrimination medium appears to be completely black.

In this condition, in observing through an optical filter which selectively transmits a right-handed circularly polarized light, only the right-handed circularly polarized light in red which is reflected at the cholesteric liquid crystal layer 103 is transmitted through the filter, and an image which is the same as the case in which it is looked at directly is observed.

The optical filter which transmits right-handed circularly polarized light and the optical filter which transmits left-handed circularly polarized light are utilized by switching in a timely manner, and a significant difference in the appearance of the discrimination medium is observed. By utilizing this difference in appearance, effective determination of authenticity is performed.

The case of heating the discrimination medium with, for example, a dryer will be explained. In this case, thermosensitive ink layer 102 changes to be transparent at 35° C. or higher.

In this case, when the discrimination medium is observed from the side of the cholesteric liquid crystal layer 103, the above hologram 105 and the printed FIG. 104 on the surface of the substrate 101 is observed. That is, the printed FIG. 104 is slightly visible in addition to the hologram 105. In this case, the reflected light which is transmitted through the cholesteric liquid crystal layer 103 and is reflected at the substrate is also observed, and the red color of the background 201 and the hologram 105 shown in FIG. 2A are thereby pale. This condition is shown in FIG. 2B. FIG. 2B shows the condition in which the hologram 105 and the printed FIG. 104 on the surface of the substrate are viewed at the same time.

In this case, when the discrimination medium is observed by using the optical filter which selectively transmits a right-handed circularly polarized light, the hologram 105 is mainly visible. When the discrimination medium is observed by using the optical filter which selectively transmits a left-handed circularly polarized light, not the hologram 105 but only the printed FIG. 104 is observed. The reason for this is that the reflected light from the substrate 104 includes a component which is not shut off at the optical filter which selectively transmits a left-handed circularly polarized light.

When only the printed FIG. 104 is observed by the optical filter which selectively transmits a left-handed circularly polarized light, by cooling the discrimination medium and lowering the temperature of the thermosensitive ink layer 102, the thermosensitive ink layer 102 changes to black and the printed FIG. 104 will not be visible.

In the condition shown in FIG. 2B, when the temperature of the thermosensitive ink layer 102 is lowered, the thermosensitive ink layer 102 changes to black and the printed FIG. 104 will not be visible. Then, the reflected light from the substrate layer 101 will not be visible, and the hologram 105 tinged with red with a metallic luster in the background of the red with a luster will be observed as the same case as shown in FIG. 2A. This condition is shown in FIG. 2C.

At ordinary temperature, when the discrimination medium is observed by using the optical filter which selectively transmits a left-handed circularly polarized light, it appears to be black overall. In such a condition, the thermosensitive ink layer 102 becomes transparent by heating, and the visual effect in which the printed FIG. 104 on the substrate 101 emerges is obtained.

Thus, the discrimination medium showing different specific views may be obtained by selecting heating or not. Accordingly, the determination of authenticity having a good discriminating function is performed. Specifically, according to the discrimination of two steps by selecting heating or not, a hidden security (covered security) is obtained, and high security is performed. Moreover, the check is performed at three steps by using the polarized filter at the same time.

The printing surface of the substrate is sealed and the printed contents are difficult to counterfeit, and good anti-counterfeiting effects are thereby obtained.

Manufacturing Method of the First Embodiment

Figure 6:
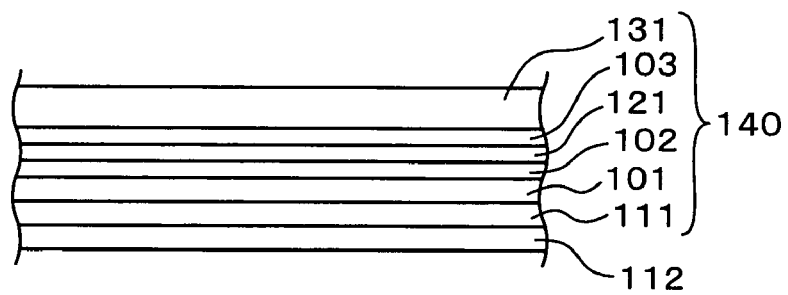
FIG. 6 shows a detailed cross section of the discrimination medium shown in FIG. 1.
Figure 7:
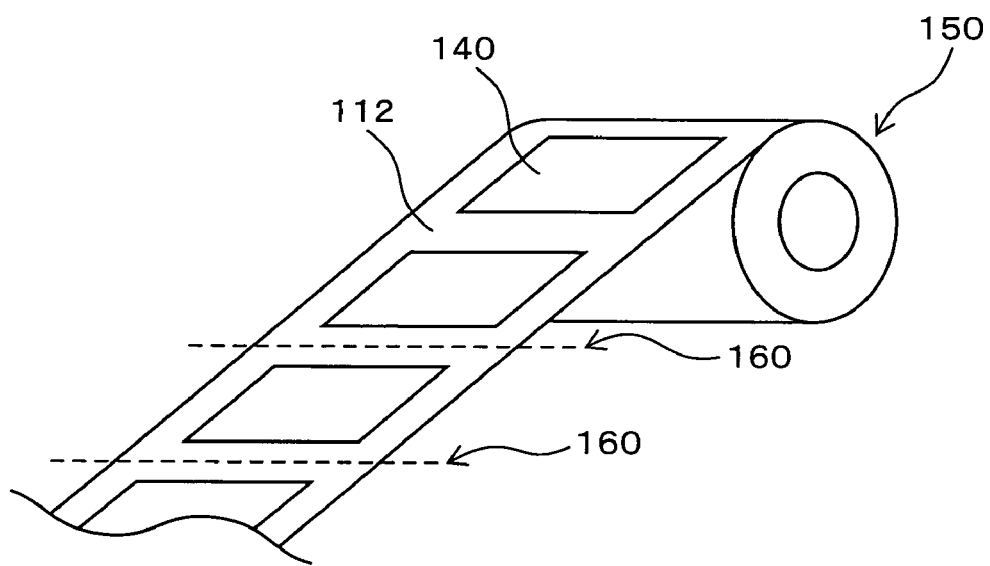
FIG. 7 shows a schematic perspective view of a discrimination medium before it is cut off.

FIG. 6 shows a detailed cross section of the discrimination medium shown in FIG. 1. FIG. 7 shows a schematic perspective view of a discrimination medium before it is cut off. Manufacturing process of the discrimination medium is outlined as follows.

A polymer cholesteric liquid crystal is coated 1 μm thick on the surface of a TAC (triacetylcellulose) film 131 which is 40 μm thick and is oriented, and the cholesteric liquid crystal layer 103 which reflects right-handed circularly polarized light in red is formed.

The cholesteric liquid crystal layer 103 is embossed by applying heat and pressure with a hologram punch, and a figure of a hologram (for example, refer to numeral 105 shown in FIG. 1) is formed. A member 1 in which the cholesteric liquid crystal layer 103 is formed on the TAC film 131 is obtained.

Then, a figure such as 104 shown in FIG. 1 is printed on a surface of a PET (polyethylene terephthalate) film 101 at 25 μm thick, and a thermosensitive ink is screen-printed thereon. A manufacturing method of a thermosensitive ink is explained below.

A thermosensitive ink layer 102 is obtained by drying the thermosensitive ink. Thus, a member 2 in which the thermosensitive ink layer 102 is formed on the printed surface of the PET film 101 is obtained.

The above member 1 is bonded to the member 2 via a setting adhesive layer 121 such that the cholesteric liquid crystal layer 103 and the thermosensitive ink layer 102 face each other. The setting adhesive layer 121 may be transparent after bonding the members 1 and 2.

An adhesive layer 111 is adhered to the exposed surface of the PET film 101, and a separator (exfoliate paper) 112 is adhered thereon. Thus, a stacked body in which the separator 112, the adhesive layer 111, the PET film (substrate layer) 101, the thermosensitive ink layer 102, the setting adhesive layer 121, the cholesteric liquid crystal layer 103 formed with a hologram, and the TAC film 131 are laminated in order from the bottom, is obtained.

For example, this stacked body is formed into a strip shape 0.1 m wide and 100 m long. The strip-shaped stacked body is longitudinally cut into pieces 5 cm wide, and this is processed in the way shown in FIG. 7 so that the stacked bodies 140 remain with, a predetermined clearance on the separator 112.

That is, the stacked body composed of the adhesive layer 111, the PET film (substrate layer) 101, the thermosensitive ink layer 102, the setting adhesive layer 121, the cholesteric liquid crystal layer 103 formed with a hologram, and the TAC film 131 is partially incised and removed, so that the rest remains as the stacked body 140 with plural island shapes as shown in FIG. 7.

For example, a structure is obtained in which pieces of the stacked body 140 which are 3 cm wide and 2 cm long are fixed at a predetermined clearance on the strip-shaped separator 112 which is 5 cm wide (refer to FIG. 7).

FIG. 7 shows a condition 150 in which the strip-shaped separator 112 is rolled. For practical use, the separator 112 is cut at the line shown by the dotted line 160, and the cut piece is used. The cut piece is fixed to an article with the adhesive layer 111 by removing the separator 112 (refer to FIG. 6) and exposing the adhesive layer 111.

An embodiment for using the discrimination medium in addition to the above embodiment is one in that the separator 112 is pulled out from the rolled condition 150 and the stacked body 140 is removed from the separator 112 and is adhered to an article for discriminating. Moreover, the separator 112 may be perforated along a dotted line 160 and may be cut off so as to obtain a piece.

In the embodiment, a figure made from materials or paints which reflect predetermined color may be formed on the surface of the thermosensitive ink layer 102 (surface of the viewing side) without forming the hologram 105. In this case, the reflected light from the cholesteric liquid crystal layer exhibits color shifting, but the reflected light from the figure formed on the surface of the thermosensitive ink layer 102 does not show color shifting, and the discriminating function is thereby obtained by that difference.

As a cholesteric liquid crystal layer, in addition to the composition reflecting a right-handed circularly polarized light in red, a composition reflecting a left-handed circularly polarized light in red and a composition reflecting a right-handed or a left-handed circularly polarized light in wavelength ranges not including red may be used.

The circling direction and the center wavelength of the reflected light are set by adjusting the distance (pitch P) in which the molecular long axis is rotated through 360° and returns to the initial state in the cholesteric liquid crystal layer.

The setting adhesive layer 121 may be composed of adhesive materials. The setting adhesive layer is defined as a layer in which a setting adhesive is hardened and bonds articles. The adhesive layer is defined as a layer in which an adhesive is not hardened and adheres articles.

Manufacturing Method for Thermosensitive Ink

An example of a thermosensitive ink forming the thermosensitive ink layer 102, specifically a case of using a pigment which is microencapsulated will be explained hereinafter. In this case, the pigment is composed of a film containing a photopolymerization composition and an aliphatic amine or an aromatic amine, and the film includes reversible heat allochroic compositions and is ionized by an acid material.

An example of the manufacturing method of the thermochromic material will be explained. First, (a) 4 weight parts of 3-dibutylamino-6-methyl-anilinofluoran as an electron-donor coloring organic compound, (b) 6 weight parts of 4-hydroxyphenyl-2-methylpropane as an electron-recipient compound, (c) 20 weight parts of stearyl caprate as a reactive medium, and 25 weight parts of cetyl alcohol were mixed and dissolved with warming. 12 weight parts of epoxy resin and 50 weight parts of solubilizer were mixed into the dissolved solution and were emulsified in a 15 wt % gelatin solution.

50 weight parts of 10 wt % solution of diethylene triamine/epoxy resin adduct was dripped into the gelatin solution, and a dispersed microcapsule solution in which microcapsules of epoxy resin film made from epoxy/amine were dispersed was obtained.

100 weight parts of the dispersed microcapsule solution in which citric acid was added to adjust the pH to 2.0 was stirred at 75° C. for 30 minutes. An ink showing reversible thermosensitive change was obtained by centrifuging the solution.

The thermosensitive ink layer 102 is obtained by forming a layer on the forming face with the ink.

2. Second Embodiment

A multilayer film formed by laminating plural light transparent films having different refractive indexes is used instead of the cholesteric liquid crystal layer shown in the First Embodiment.

A multilayer film in which light transparent films made from polyethylene-2,6-naphthalate and light transparent films made from copolyethylene terephthalate are alternately laminated may be mentioned as a multilayer film. The material for the multilayer film is not limited to the above material. Not only the films of the different kind of materials, but also the films of the same kind of materials having different refractive indexes may be combined together. An anisotropic multilayer film may be formed by changing the draw rate in the lengthwise direction and the crosswise direction. Anisotropy shows different color changes in the lengthwise direction and the crosswise direction by tilting the discrimination medium.

The multilayer film is formed with a hologram, and superior discriminating function is thereby obtained. That is, a figure of the hologram of the multilayer film is observed accompanied with color shifting at ordinary temperature, and a figure printed on the substrate is observed by heating. In this case, the figure printed on the substrate is not accompanied with color shifting, and an optical function having superior discriminating function is obtained.

3. Third Embodiment

A photochromic ink may be used instead of the thermosensitive ink layer shown in First Embodiment. The photochromic ink is, for example, an ink which changes color when it is irradiated with ultraviolet light.

As a photochromic ink, an ink which is transparent under ordinary white light and changes to a predetermined color state (for example, black or a dark color) when it is irradiated with ultraviolet light of a predetermined wavelength and at high intensity may be mentioned.

In this case, a significant difference in appearance of the figure is due not to the heating condition explained in the First Embodiment, but due to the irradiating conditions of the ultraviolet light.

4. Fourth Embodiment

A multilayer film may be used instead of the PET film explained in the above embodiment. In this case, the reflected light from the substrate (refer to numeral 101 in FIG. 1) exhibits color sifting, and an optical discriminating function together with the reflected light from the cholesteric liquid crystal layer is obtained.

The embodiment will be explained with reference to FIG. 1. The substrate 101 is a multilayer film formed by laminating alternately not less than 100 layers of the light transparent films having two kinds of refractive index. The difference of the refractive indexes is easy to obtain by the difference in drawing conditions. In addition, the multilayer film may be formed by laminating alternately PET films and acrylic films.

In this structure, the case of observing the discrimination medium from the side of the cholesteric liquid crystal layer 103 will be explained. First, at ordinary temperature, the thermosensitive ink layer 102 is black and the hologram 105 is visible tinged with red with a metallic luster in a background of red with a metallic luster is viewed. As the viewing angle increases, color shifting is observed, and the overall color shifts toward shorter wavelengths.

The thermosensitive ink layer 102 becomes transparent and the reflected light from the substrate 101 composed of a multilayer film is observed by heating. In this case, besides the color shifting of the cholesteric liquid crystal layer 103, the color shifting of the substrate 101 influences visual effects and more complicated changes of specific colors are observed.

In the case of applying a multilayer film to a substrate, the substrate of the multilayer film is formed with a hologram, and optional signs may be shown by the hologram. Moreover, an appropriate figure may be printed on the surface or back of this multilayer film. In order to improve optical function of the multilayer film, a light absorption layer is preferably mounted on the back thereof. For example, as a light absorption layer on the back of this multilayer film, a setting adhesive layer and an adhesive layer to which is added black or dark color pigments may be used. A printed layer which is black or a dark color mounted on the back of the multilayer film may be used as a light absorption layer.

5. Fifth Embodiment

In the First Embodiment shown in FIG. 1, a conventional bar code may be used as the printed FIG. 104. In this case, besides the discrimination by visual observation of the hologram 105, the discrimination by bar code may be performed. In this case, the bar code is not scanned at ordinary temperature; it is scanned when it is subjected to heating.

In this embodiment, the reflected light from the cholesteric liquid crystal layer 103 exhibits color shifting, and the determination of the authenticity is thereby performed by a combination of color change of color shifting and bar code data. By utilizing such a specific optical phenomenon, a technique of determination of the authenticity, in which the ability to detect counterfeits is extremely good, is obtained.

6. Sixth Embodiment

Figure 8:
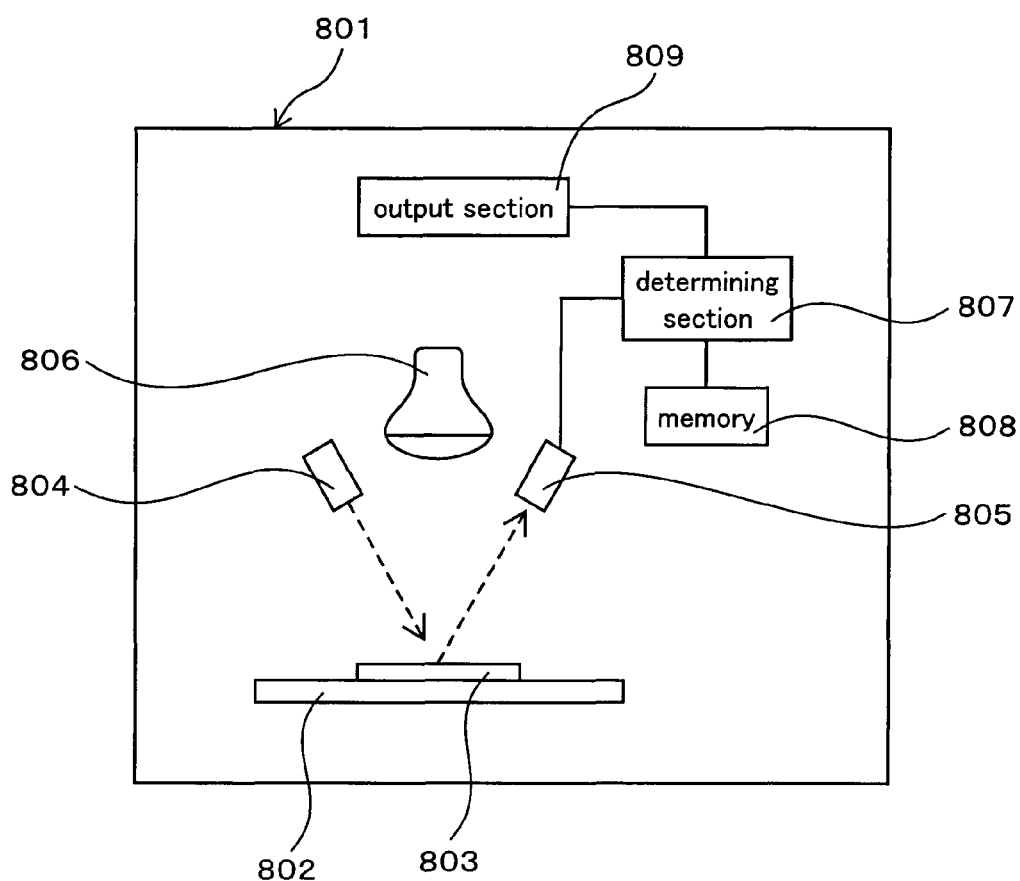
FIG. 8 shows a schematic view of an example of an apparatus for determining authenticity of the discrimination medium of the present invention.

FIG. 8 shows a schematic view of an example of an apparatus which determines the authenticity of the discrimination medium of the present invention. In FIG. 8, the apparatus includes a device for determining the authenticity 801, a stage 802, an article for determining the authenticity 803, a device for irradiating visible light 804, a camera 805, a heating lamp 806, a determining section 807, a memory 808, and an output section 809.

The stage 802 is provided for setting the article for determining the authenticity 803. For example, the article for determining the authenticity 803 is an identification which is mounted with the discrimination medium shown in FIG. 1. The heating lamp 806 has a function of heating the article for determining the authenticity 803 by irradiating infrared light. The determining section 807 has a function of analyzing images photographed by the camera 805 and determining the authenticity. The memory 808 is provided for storing data which are referred to the determining process at the determining section 807.

The output section 809 is a data output means for showing a result of the determining process performed by the determining section 807. A display and a warning buzzer may be applied to the output section 809.

An operation example of an apparatus for determining authenticity is specifically explained hereinafter. An example of the process of determining authenticity against the discrimination medium shown in FIG. 1 is explained.

Image data of the discrimination medium which was heated and which was not heated are stored to the memory 808 beforehand.

In the determination of the authenticity, an article for determining the authenticity 803 is set on the stage 802. In this condition, the heating lamp 806 is turned off and white light is irradiated from the apparatus for irradiating visible light 804. The discrimination medium not shown on the article for determining the authenticity is photographed by the camera 805.

The image photographed by the camera 805 and the image stored in the memory 808 are compared at the determining section 807. If the images are the same or different with acceptable error, the article is determined to be genuine. If the images are different, the article is determined to be counterfeit. The result of this determination is shown at the output section 809.

In this case, the image photographed by the camera 805 has color information including color shifting, and the article is thereby discriminated by the difference of this color information if the cholesteric liquid crystal layer is counterfeited.

When the article is determined to be genuine in the above determination, the next step is as follows. The heating lamp 806 is turned on and the discrimination medium is heated in the next step. When the discrimination medium is heated at a predetermined temperature or higher by the heating lamp 806, the thermosensitive ink layer 102 becomes transparent and the printed FIG. 104 appears. This change is photographed by the camera 805 and the image data is sent to the determining section 807.

In the determining section 807, a preliminarily stored image when the thermosensitive ink layer 102 is transparent and the image which was photographed are compared. If the images are the same or different with acceptable error, the article is determined to be genuine. If the images are different, the article is determined to be counterfeit. The result of this determination is shown in the output section 809. The function of determination of the authenticity is improved by two steps of the determination process thereby.

The determination of the authenticity may be performed by determining if the change in the images of before heating and after heating is the same as the change in the images stored beforehand.

In this condition, the image photographed by the camera 805 may be shown in the output section and a visual check may be used at the same time. The stage 802 may be provided with a tilt mechanism and an angle formed by visual line of the camera 805 and vertical line against the surface of the discrimination medium is optionally changed, in order to record the way the color shifts in the contents of the determination.

The light axis of the camera 805 may be provided with an optical filter which may or may not be inserted, in order to transmit or not to transmit a circularly polarized light of predetermined circling direction selectively. In this case, the image to be photographed changes according to whether or not the optical filter is inserted. The function of determination of the authenticity is further improved by recording the way in which the image changes in the process of the determination.

INDUSTRIAL APPLICABILITY

The present invention may be applied to discrimination media having visual discriminating functions.

The invention claimed is:

1. A discrimination medium comprising:
    an optical functional layer including thermochromic material or photochromic material; and
    a color shifting layer mounted on the optical functional layer.

2. The discrimination medium according to claim 1, wherein the color shifting layer is a cholesteric liquid crystal layer.

3. The discrimination medium according to claim 1, wherein the optical functional layer is mounted on a substrate layer, which is printed or formed with a hologram.

4. The discrimination medium according to claim 3, wherein the substrate layer is a multilayer film formed by laminating plural light transparent films having different refraction indexes.

5. The discrimination medium according to claim 1, wherein the color shifting layer is a multilayer film formed by laminating plural light transparent films having different refraction indexes.

6. The discrimination medium according to claim 1, wherein the optical functional layer comprises an ink which appears to be nearly black at ordinary temperature and becomes transparent at a predetermined temperature which is higher than the ordinary temperature.

7. The discrimination medium according to claim 1, wherein the optical functional layer comprises an ink which changes color by irradiation of a light of predetermined wavelength.

8. The discrimination medium according to claim 1, wherein the optical functional layer functions as a light absorption layer.

9. The discrimination medium according to claim 1, wherein the color shifting layer is formed with a hologram.

10. The discrimination medium according to claim 1, wherein the color shifting layer is formed with a hologram and the optical functional layer is printed or formed with a hologram.

11. A discrimination method for a discrimination medium comprising an optical functional layer including thermochromic or photochromic material and a color shifting layer mounted on the optical functional layer, the method comprising:
- a step without heating or irradiating of light on the discrimination medium; and
- a step including heating or irradiating of light on the discrimination medium; or
- a step for changing the optical functional layer to show light absorbability or maintaining the state thereof; and
- a step for changing the optical functional layer to show light transparency or maintaining the state thereof.

12. A discrimination method for a discrimination medium comprising an optical functional layer including thermochromic or photochromic material and a color shifting layer mounted on the optical functional layer, the method comprising:
- a first step for detecting light reflected from the discrimination medium at a first temperature or without irradiating of light;
- a second step for detecting light reflected from the discrimination medium at a second temperature which is higher than the first temperature or with irradiating of light; and
- a step for determining an authenticity process with reference to the first step detecting reflected light and the second step detecting reflected light.

* * * * *